UNITED STATES PATENT OFFICE.

FRIEDRICH MÜLLER, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

BLEACHING FATS AND OILS.

1,089,253.     Specification of Letters Patent.     Patented Mar. 3, 1914.

No Drawing.     Application filed February 20, 1912. Serial No. 678,879.

*To all whom it may concern:*

Be it known that I, FRIEDRICH MÜLLER, a subject of the King of Prussia, residing at Ludwigshafen-on-the-Rhine, Germany, have invented new and useful Improvements in Bleaching Fats and Oils, of which the following is a specification.

The usual method of bleaching oils and fats of animal and vegetable origin has chiefly consisted in treating them with animal charcoal or in filtering them through fullers' earth. These processes are expensive and entail loss of material.

I have found that animal and vegetable fatty oils can be very well bleached by treating them in the presence of an alkaline reagent, and preferably while hot, with solutions of hydrosulfites or of their compounds with aldehydes, ketones, etc., or of the corresponding sulfoxylates. For the purpose of this invention compounds of hydrosulfites with aldehydes, ketones, etc., and the corresponding sulfoxylates are equivalent to hydrosulfites. The alkali first of all combines with the free fatty acid, which is always present in the crude fats, and then, in some cases, with a part of the fat itself, forming soap. The soap enables the aqueous hydrosulfite solution to mix intimately with the fat, and the excellent bleaching action is due to its presence. Hence it is equivalent to replace the alkali or a part thereof from the commencement by soap. The reaction can be carried out either by first of all adding the alkali to the fat and subsequently the hydrosulfite, or the two components can be simultaneously added, for instance, in the form of an alkaline hydrosulfite solution. After the oil has been bleached, it is allowed to settle and is then separated from the soapy solution and washed.

The following example will serve to illustrate further the nature of my invention, which, however, is not confined to this example. 1,000 kilos of crude cocoanut oil, containing 3% free fatty acid, are placed in a vessel provided with a stirrer and heated to about 100° C. by means of direct steam, and a quantity of water is added to make up the total quantity of water present to about 100 liters. To the hot mixture of oil and water a solution is slowly added of 14 liters of caustic soda solution of 40° Bé. and 1 kilo of sodium hydrosulfite in about 100 liters of water. The mixture is heated, while stirring, for about another 30 minutes, then allowed to settle, the soap solution which settles on the bottom of the vessel is drawn off and the last traces of soap are removed by repeated washing with water. The process can be worked in a similar manner when replacing the sodium hydrosulfite by an equal quantity of sodium formaldehyde sulfoxylate, or of sodium formaldehyde hydrosulfite, prepared, for instance, from 1 kilo of sodium hydrosulfite, 14 liters of caustic soda solution of 40° Bé., 750 cubic centimeters of 40° formaldehyde solution, and 100 liters of water.

Now what I claim is:—

1. The process of bleaching fats and oils of vegetable and animal origin by treating the same with solutions of hydrosulfites in the presence of alkaline reagents.

2. The process of bleaching fats and oils of vegetable and animal origin by treating them with an alkaline solution of sodium hydrosulfite.

In testimony whereof I have hereunto set my hand in the presence of two subscribing witnesses.

FRIEDRICH MÜLLER.

Witnesses:
J. ALEC. LLOYD,
A. C. TITTMANN.

Copies of this patent may be obtained for five cents each, by addressing the "Commissioner of Patents, Washington, D. C."